(12) United States Patent
Müllinger et al.

(10) Patent No.: US 6,544,312 B2
(45) Date of Patent: Apr. 8, 2003

(54) DEVICE FOR SEPARATING THE PARTICLE-SIZE SPECTRUM OF A POLYDISPERSE AEROSOL

(75) Inventors: Bernhard Müllinger, Huldsessen (DE); Joachim Heyder, München (DE)

(73) Assignee: GSF Forschungszentrum fur Umwelt und Gesundheit GmbH, Neuherberg (DE)

(*) Notice: Subject to any disclaimer, the term of this patent is extended or adjusted under 35 U.S.C. 154(b) by 0 days.

(21) Appl. No.: 09/957,705

(22) Filed: Sep. 17, 2001

(65) Prior Publication Data

US 2002/0007620 A1 Jan. 24, 2002

Related U.S. Application Data

(63) Continuation-in-part of application No. PCT/EP00/02931, filed on Apr. 1, 2000.

(30) Foreign Application Priority Data

Apr. 12, 1999 (DE) .......................... 199 16 307

(51) Int. Cl.$^7$ ............................................... B01D 45/00
(52) U.S. Cl. ..................... 55/434; 96/413; 73/863.21
(58) Field of Search .......................... 96/188, 355, 413; 73/28.04, 28.05, 863.21, 863.22, 863.41; 55/434

(56) References Cited

U.S. PATENT DOCUMENTS

| | | | |
|---|---|---|---|
| 4,767,524 A | * | 8/1988 | Yeh et al. .................... 209/143 |
| 5,235,969 A | | 8/1993 | Bellm |
| 5,412,975 A | | 5/1995 | Raabe et al. |
| 5,800,598 A | | 9/1998 | Chein et al. |

FOREIGN PATENT DOCUMENTS

DE      195 05 341      8/1996

* cited by examiner

*Primary Examiner*—Robert A. Hopkins
(74) *Attorney, Agent, or Firm*—Klaus J. Bach

(57) ABSTRACT

In a device for separating the particle size spectrum of a polydisperse aerosol comprising a housing including an inlet part, a guide part, an outlet part, a nozzle insert and a separation insert, all parts are axially symmetrical and joined by centering fits so that they are easy to manufacture and can easily be assembled and also replaced. The parts are so fitted together that they are automatically centered during assembly while providing for the properly sized aerosol and air supply and particle fraction extraction channels.

5 Claims, 3 Drawing Sheets

DEVICE FOR SEPARATING THE PARTICLE-SIZE SPECTRUM OF A POLYDISPERSE AEROSOL

This is a continuation-in-part application of international application PCT/EP00/02931 filed Apr. 1, 2000 and claiming the priority of German application 19 16 307.3 filed Apr. 12, 1999.

BACKGROUND OF THE INVENTION

The invention relates to a device for separating the particle-size spectrum of a polydisperse aerosol, comprising an aerosol channel, a clean gas supply channel, a separation section and at least two discharge channels with a linear flow passage disposed between the aerosol channel and the discharge channels.

Such a separating device is known for example from DE 195 05 341.

Aerosols are used in medicine for inhalation therapy. In the environmental analysis tasks, the devices improve the analysis of atmospheric aerosols. Industrial aerosol processes can be carried out in a more effective manner.

From V. Prodi, C. Melandri, T. DeZaiacomo, G. Tarromi, D. Hochrainer (1979), "An Inertial Spectrometer for Aerosol Particles", J. Aerosol Science, 10 (1979) pages 411–419) such an apparatus is known: Inertial Particle Aerosol Classifier (IPAC). It is possible with the IPAC to filter out of a dry polydisperse aerosol stream a quasi-monodisperse part in the range of 0.8–8 $\mu$m with a geometric standard deviation of 1.2–1.3.

The IPAC apparatus is cylindrical in shape and consists of two parts. Into the upper part (separating part) of the apparatus, the polydisperse aerosol flows under pressure between two layers of enveloping air, which is free of particles. Together with the enveloping air, the aerosol is accelerated, through a slot nozzle toward a 90° bend. Upon passing the bend, the centrifugal force causes the heavier particles to follow a travel path of greater radius than the smaller particles. The total flow is then divided in the lower part (classification part) into an outer, an intermediate and an inner airflow. With an appropriate adjustment of the different air flows, the intermediate air flow contains a particle fraction with a relatively narrow size distribution.

Furthermore, a virtual impactor is known from Conner, W. D. (1966), "An inertial-type particle separator for collecting large samples", J. Air Pollut. Control Assoc. 16 (1966), page 35. This impactor consists of an acceleration nozzle and a collection opening. The aerosol stream is accelerated through the nozzle toward the collection opening in which the classification takes place. A small part of the aerosol volume flow is sucked out through the collection opening, the main flow is sucked out at an angle of 90° with respect to the nozzle. In accordance with the different inertias of the various particles, particles, which are larger than the separation size of the impactor, reach the collection opening with the smaller volume flow. The larger volume flow contains all the particles, which are smaller than the separation size of the impactor. The particles in both air flows remain in an airsuspended state. There are several variations of the principle for improvement of the separation efficiency of this virtual impactor. One method is the "Opposing Jet" method (K. Willeke and E. Pavlik "Size classification of fine particles by opposing jets", Environmental Sciences and Technology 12 (1978), pages 563–566), wherein the virtual impactor operates in accordance with a counter-current principle. Other possibilities include the addition of particle-free fresh gas either to the smaller volume flow (H. Masuds, D. Hochrainer, and W. Stober, "An improved virtual impactor for particle classification and generation of test aerosols with narrow size distributions", J. Aerosol Sci., 10(1978), pages 275–278) or to the polydispersed aerosol stream (B. T. Chen and H. C. Yeh "An improved virtual impactor: design and performance", J. Aerosol Sci. 18(1987), pages 203–204).

A disadvantage of the IPAC is that it is suitable only for the classification of a dry aerosol. As a result, no quasi-monodisperse fraction can be filtered out of an aqueous polydispersed aerosol using the IPAC as it is possible for example with a nozzle sprayer. The yield of a quasi-monodisperse aerosol in comparison with the polydisperse input aerosol is only 10%.

The main disadvantage of the virtual impactor resides in its relatively indefinite separation capability since a certain amount of particles, which are smaller than the separation size of the impactor, are always contained in the airflow of the large particle. The virtual impactor accordingly provides only for a high enrichment but no separation according to the size of the particles of the polydisperse aerosol. Also, the size range of the aerosol being classified cannot be changed during operation of the impactor in a stepless manner.

Such an apparatus has the disadvantage that it is difficult to adjust and that high turbulences occur in the flow because of the sharp-edged separation surfaces whereby the separation effectiveness is reduced.

It is the object of the present invention to provide a device of the type discussed above which however is so designed that it can be easily assembled and that a quasi-monodisperse fraction can be filtered out of a polydisperse aerosol stream with high efficiency.

SUMMARY OF THE INVENTION

In a device for separating the particle size spectrum of a polydisperse aerosol comprising a housing including an inlet part, a guide part, an outlet part, a nozzle insert and a separation insert, all parts are axially symmetrical and joined coaxially by centering fits so that they are easy to manufacture and can be easily assembled and also replaced. The parts are so fitted together that they are automatically centered during assembly while providing for the properly sized aerosol and air supply and particle fraction extraction channels.

A particular advantage of this device, which will be called below IAPS (Inertial Aerosol Particle Separator), resides in the fact that a quasi-monodisperse fraction of an easily steplessly adjustable size range can be derived from an aqueous or a dry polydisperse aerosol flow.

Below, an embodiment of the invention will be described in greater detail on the basis of the accompanying drawings.

DESCRIPTION OF A PREFERRED EMBODIMENT

Figure 1:
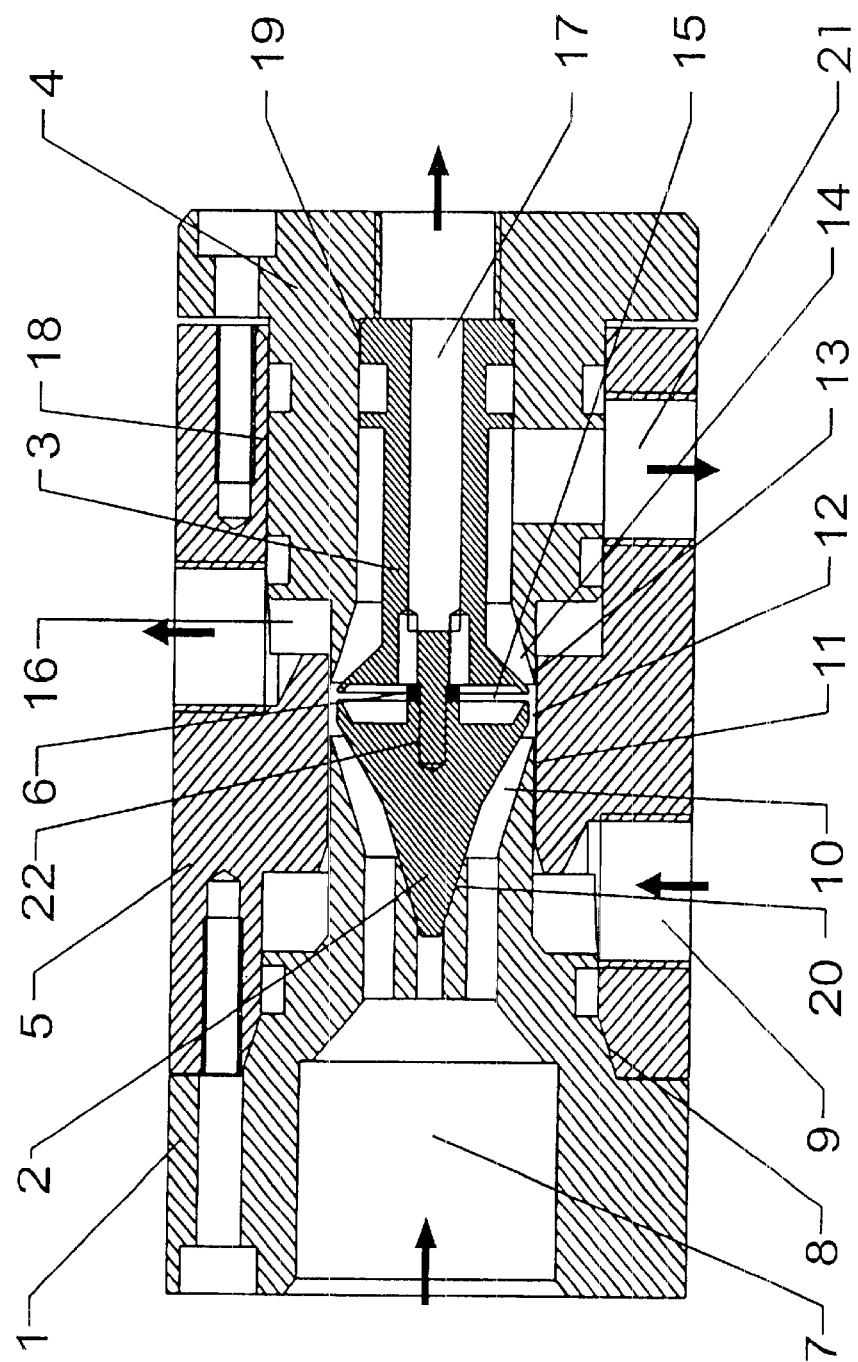
FIG. 1 is a longitudinal cross-sectional view of the separator, the cross-sectional plane including the rotational symmetry axis of the device.

The IAPS is of cylindrical, that is essentially axially symmetrical, design. As shown in FIG. 1, it consists of an inlet part 1 and a guide part 5, which together determine the geometry of the fresh air channel 9, by means of a centering 7 cone 8. The inlet part 1 includes a central aerosol supply channel 7, which is narrowed down at its inner end in the form of a truncated cone. At the inner end of the supply channel 7, the inlet part 1 is provided with closely adjacent axial bores for conducting the aerosol flow to an axial symmetrical aerosol admission channel 10. Together with a nozzle insert 2, the inlet part 1 defines the shape of the aerosol admission channel 10 and also of the acceleration channel 12. The inlet part 1 and the guide part 5 define the fresh air passage 11 extending axially from the fresh air inlet channel 9. The nozzle insert 2 is centered with respect to the inlet part 1 by a cone 20. A spacer 6 defines the distance of the extraction channels from the nozzle insert 2. A separation insert 3 defines the shape of the extraction channel 15 for the small particle size fraction and, at the same time, determines, together with the outlet part 4 and the guide part 5, the geometry of the quasi-mono-disperse extraction channel 14. The separation insert 3 is positioned by a fitted shoulder 19 in the outlet part 4 and a fitted pin 22 seated in the nozzle insert 2. The outlet part 4 and the guide part 5 define together the geometry of the outlet channel 13 for the large particle fraction. The large, the quasi-monodisperse and the small particle fractions are conducted out of the device by way of the radial passages 16, 21 and the axial passage 17. The TAPS components are held together by bolts extending between the inlet part 1 and the guide part 5 and between the outlet part 4 and the guide part 5. Each connection includes at least 3 bolts distributed equally spaced along a circle around the symmetry axis of the device. The parts 1 to 5 are sealed with regard to one another by seal rings. Grooves for receiving the seal rings are shown in the figure. The seal rings are not shown. With low manufacturing tolerances such seal rings can be eliminated.

Figure 2:
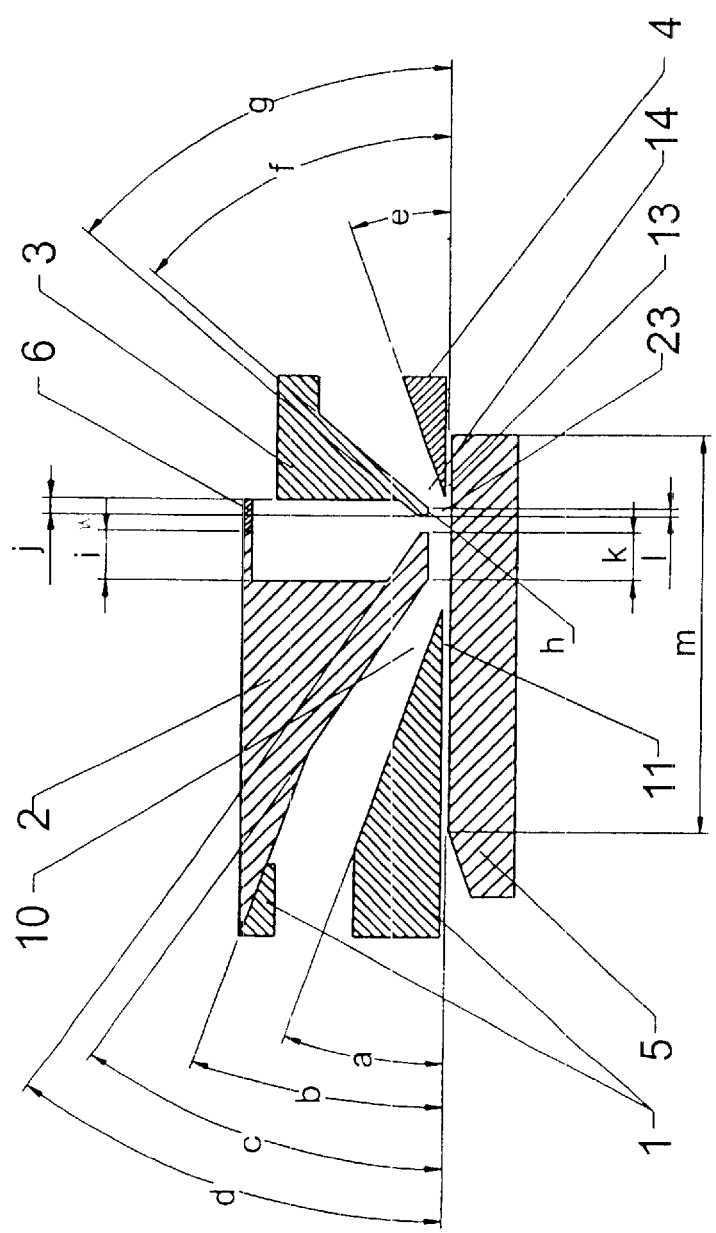
FIG. 2 and FIG. 3 show enlarged cross-section of the separation area with different reference numerals and letters for indicating the various dimensions.
Figure 3:
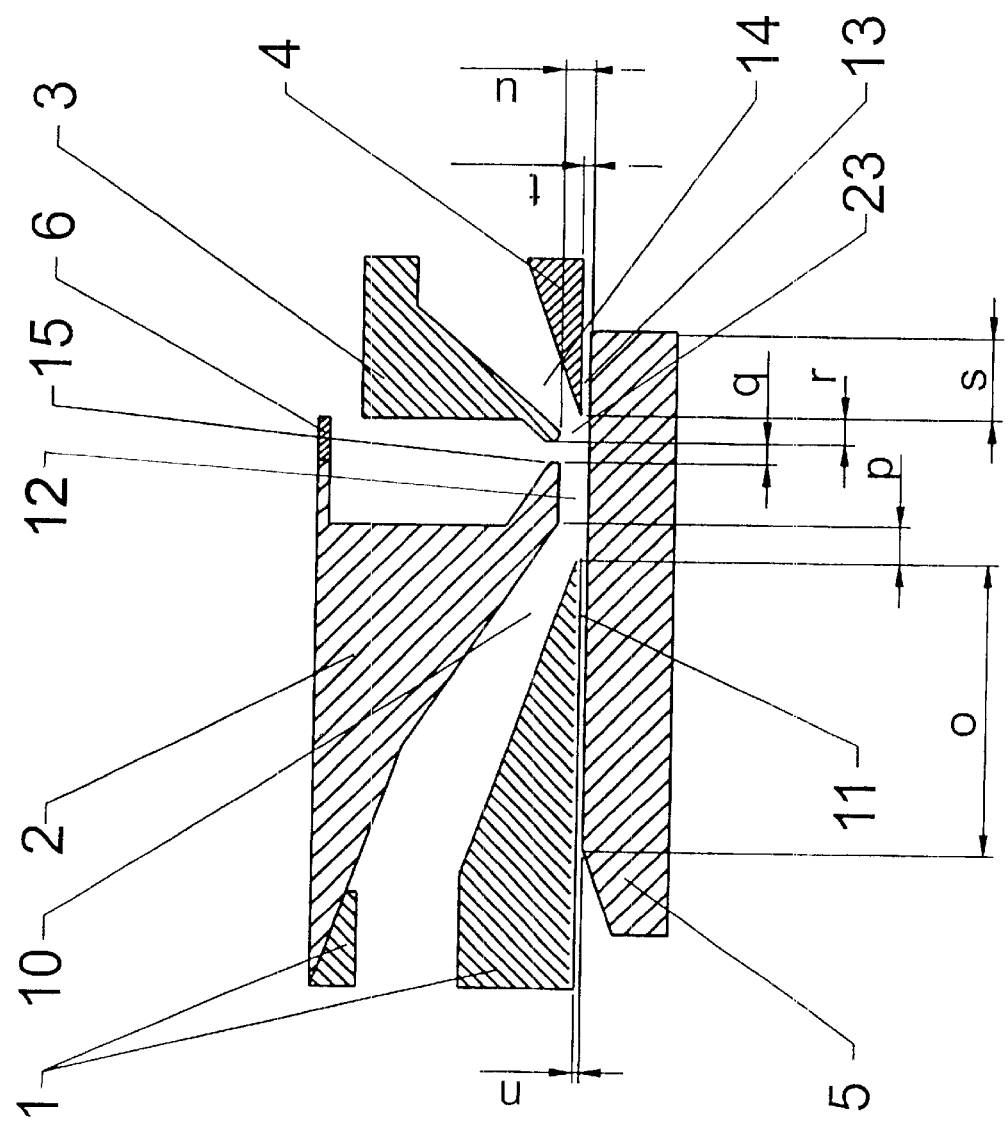

In FIG. 2 and FIG. 3, the center part of the device is shown enlarged including portions of the guide part 5 and parts of the inserts 2, 3 and of the inlet and outlet parts 1, 4. The aerosol stream is conducted through the aerosol admission channel 10 at an angle of 20°–35° (a, c) toward the fresh air stream which is accelerated in the 0.15 mm (n)-wide fresh air passage 11 to a speed of 26 m/sec. The annular gap of the fresh air passage 11 has an outer diameter of 16 mm. The aerosol stream is conducted into the fresh air stream which is accelerated to 5–11 times the speed at a location 0.57 mm (p) ahead of the 1.43 mm (r) long and 0.6 mm(u) wide acceleration channel 12. This prevents turbulence and a mixing of the two volume streams ahead of the acceleration channel 12.

After the acceleration channel 12, the main volume flow is diverted 90° into the 3.5 mm (q) wide third extraction channel 15. Small particles with a particle size of 1.7 $\mu$m and smaller and with low inertia cannot penetrate the fresh air stream and follow the flow of the main volume. The first extraction channel 15 becomes wider after a radius of 0.2 mm (h) by 0.5 mm(j) with an angle of 50° (g). At the admission side, the channel becomes wider after 0.2 mm with an angle of 35° (d) by 1.5 mm (i).

Particles of a size of 0.7 to 4 $\mu$m selectively enter the second extraction channel 14, which is formed between the separation insert 3 with the radius 0.2 mm(h) and the separation edge of the outlet part 4. The extraction channel 14 is defined by the angle of the separation insert with respect to the guide part 5 of 50° (f) and the angle of the outlet part with respect to the guide part 5 of 20° (e). The distance from the guide part is 0.6 mm (u).

Particles form a size of 3 $\mu$m are diverted into the first extraction channel 13, which is formed by a 0.1 mm(t) wide and 1.9 mm long channel together with the guide part 5. In this way, the separation edge of the outlet part 4 is recessed with respect to the separation edge of the separation insert 3 by 0.6 mm (r).

By replacement of the inserts 2, 3, 6, the geometry of the arrangement can be changed as follows: With the nozzle insert 2, the width of the acceleration channel 12 can be reduced for example by 0.3 mm(u). The width (q) of the third extraction channel can be selected by spacer inserts from 0.1 to 1.2 mm in 0.2 mm increments. With the separation inserts 3, the distance (u) to the guide part can be changed.

The separation characteristics of the arrangement can be changed and optimized already by small changes in the geometry—with constant volume flows. In the second extraction channel in the way, a quasi monodisperse size fraction with a geometric standard deviation of 1.15–1.3 and a particle size with a medium mass diameter of 0.7–4 $\mu$m can be extracted from the polydisperse aerosol.

With appropriate selection of the inserts, the size of the quasi-monodisperse fraction can be adjusted. If the distances (u) of the nozzle insert and of the separation insert are increased from 0.3 to 0.6 mm, the particle size extracted in the second extraction channel is also increased. Smaller distances (q) for the third extraction channel provide for an extraction of smaller particles by way of the second extraction channel.

If the distance at the separation insert (u) is larger by the factor 2 than the distance of the nozzle insert (u), the yield is substantially increased.

By an adjustment of the inlet flow volumes (fresh air and polydisperse aerosol) and of the volume flows through the three extraction channels, the yield for the desired extraction particle size can be optimized or the particle size can be accurately adjusted to the desired range.

The polydisperse dry or aqueous aerosol is combined with a focussed fresh air stream along an annular gap, but is not mixed with the fresh air stream.

With exchangeable inserts, the nozzle gap, the separation gap and the distance of the nozzle gap from the separation gap can be easily changed. With an exchange of the inserts, the separation properties and, consequently the selected particle size can therfore rapidly be adjusted. The flows do not have to be newly adjusted. In this way, pressure and flow controllers can be eliminated and replaced by relatively inexpensive critical nozzle inserts.

With the cylindrical arrangement, there is no need for adjustments during manufacture since the components center themselves during assembly by conical or cylindrical fits or by means of seal rings. Since the components are manufactured independently, the components of the device may consist of different materials (for example, Teflon, stainless steel, aluminum). Cylindrical components can also easily be manufactured by injection molding.

The annular arrangement of the focussing—and acceleration gaps avoid fringe effects at the edges of the nozzles. By providing a radius h at the separation edges of the component 3, turbulence and consequently, losses are minimized. The achieved mass concentrations of the dry substances are therefore increased to 85.1 $\mu$g/l, that is by a factor of 35 in comparison with the linear ASC (4% NaCl) with the same separation quality. With higher solution concentrations (12% NaCl), a mass concentration of 313.5 mg/l is achieved corresponding to an increase by a factor 116.

It is advantageous for a good separation efficiency to provide for a volume flow ratio (aerosol flow+enveloping air flow)/(monodiperse air flow+air flow of the large particle fraction) of >7/1.

The angles encompassing the aerosol admission channel provide for an advantageous separation of the aerosol if they are in the following ranges: angle a: (10–30°), angle c: (15–35°) The angles which include the monodisperse channel are preferably as follows: angle e: 15–50°, angle f larger by 20° to 40° than the angle e.

What is claimed is:

1. A device for separating the particle size spectrum of a polydisperse aerosol comprising: a housing including an inlet part, a guide part, an outlet part, a nozzle insert, and a separation insert joined to said nozzle insert, all parts being axially symmetrical and joined to one another by self-centering connections including a conical joint between said inlet part and said guide part which are engaged so as to form an annular gap defining a fresh air inlet channel, a conical joint between said inlet part and said nozzle insert for centering said nozzle insert to form with said inlet part an aerosol admission channel through which aerosol admitted to said device joins said fresh air flow so as to be enveloped thereby, said guide part closely surrounding said nozzle insert and forming therewith an annular acceleration channel into which said aerosol flow is directed enveloped by said fresh air flow, and at least two extraction channels one being formed between said guide part and said outlet part around said nozzle insert so that aerosol particles extracted through said one extraction channel have to pass through said enveloping air flow, said outlet part being centered in said guide part for accurately defining said one extraction channel.

2. A device according to claim 1, wherein a spacer insert is disposed between said nozzle insert and said separation insert permitting adjustment of the distance of the gap leading to said inner extraction channel and also the size of another extraction channel formed between said nozzle insert and said outlet part.

3. A device according to claim 1, wherein said separation insert defines the geometry of the extraction channel for the small particle fraction and provides, together with the guide part, the size of the quasi monodisperse extraction channel, said separation insert having one end fitted into the outlet part and the other end fitted to said nozzle insert so as to be in axial alignment therewith.

4. A device according to claim 1, wherein said outlet part and said guide part together define the geometry of the extraction channel for the large particle fraction of said aerosol.

5. A device according to claim 1, wherein the extraction channels for the large particle fraction and for the quasi-monodisperse fraction extend radially and the extraction channel for the small particle fraction extends axially from said device.

\* \* \* \* \*